C. P. KUEHN.
HOSE SUPPORTER.
APPLICATION FILED FEB. 1, 1915.
1,191,320.
Patented July 18, 1916.
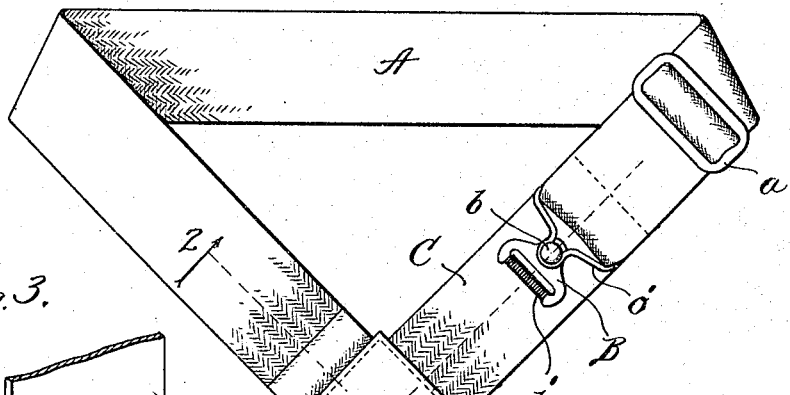
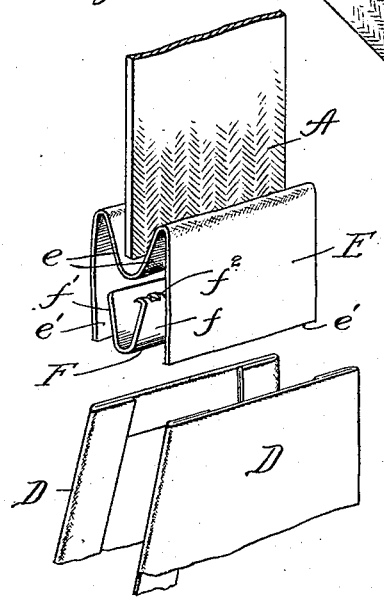
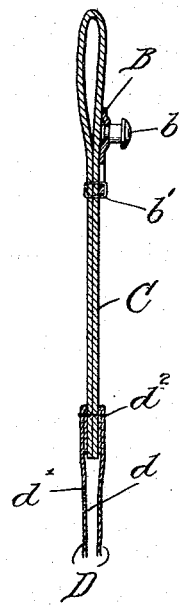
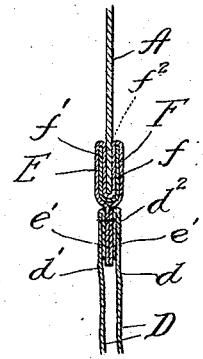
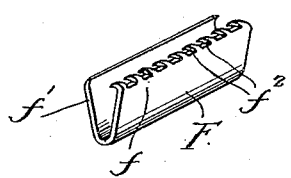

UNITED STATES PATENT OFFICE.

CHARLES P. KUEHN, OF CHICAGO, ILLINOIS, ASSIGNOR TO A. STEIN & COMPANY, OF CHICAGO, ILLINOIS, A CORPORATION.

HOSE-SUPPORTER.

1,191,320.   Specification of Letters Patent.   Patented July 18, 1916.

Application filed February 1, 1915. Serial No. 5,508.

*To all whom it may concern:*

Be it known that I, CHARLES P. KUEHN, a citizen of the United States, and a resident of Chicago, county of Cook, and State of Illinois, have invented certain new and useful Improvements in Hose-Supporters, of which I do declare the following to be a full, clear, and exact description, reference being had to the accompanying drawing, forming part of this specification.

The present invention has relation to that class of hose supporters more particularly designed for supporting short hose such as are commonly worn by men and it consists in the features of improvement hereinafter described, illustrated in the accompanying drawing and particularly pointed out in the claims at the end of this specification.

Figure 1 is a front view of a hose supporter embodying my invention. Fig. 2 is a view in section on line 2—2 of Fig. 1. Fig. 3 is a perspective view showing certain parts disassembled and the manner of assembling such parts. Fig. 4 is a perspective view of a metal clasp used in forming my hose supporter. Fig. 5 is a view in section on line 5—5 of Fig. 1.

The main portion A of the leg-encircling band of my improved hose supporter is preferably formed of elastic webbing, and as shown, the free end of this webbing is doubled upon itself and united to a slide $b$ whereby the length of the band A may be adjusted in the usual manner. Through the folded portion of the free end of the band A passes a fastening loop or member $a'$ having an eye adapted to engage with a stud $b$ that projects from a fastening plate or member B that is attached, as by a row of stitches $b'$, to a tab C (preferably of non-elastic webbing). It will be observed that the fastening plate or member B is arranged at a distance from the free end of the tab C so that the metal fastening members B and $a'$ cannot come in contact with the skin or undergarment of the wearer.

As shown, the tab C is formed of a piece of webbing folded upon itself (see Fig. 5), and the overlapping ends of this webbing are inserted between the plies $d$ and $d'$ of the pentagonal connecting member D, these plies $d$ and $d'$ being formed of silk, cotton or like fabric. The plies $d$ and $d'$ of the connecting member D, and the parts joined thereto, are united, as shown, by a row of stitching $d^2$ along the edge of the connecting member D. The fixed end of the leg-encircling band A is united to the connecting member D in a novel manner next to be described. This end of the band A is placed between the folds $e$ of a strip of fabric E and is then inserted between the jaws $f$ and $f'$ of a clamp plate F, one of these jaws being provided with teeth $f^2$, as clearly shown in Fig. 4. After the free end of the elastic band A has thus been inserted between the folds $e$ of the fabric strip E and between the jaws of the clamp plate F, these jaws will be forced firmly together, causing the teeth $f^2$ to penetrate the fabric strip E and the end of the band A. The free end portions $e'$ of the fabric strip E will then be inserted between the plies $d$ and $d'$ of the connecting member D and will be united thereto by the row of stitching $d^2$, as clearly shown in Fig. 2 of the drawing. By this means, an extremely simple, cheap and effective attachment of the end of the band A to the connecting member D may be effected, the fabric strip E covering the metal clamp and preventing its contact with the skin or undergarment of the wearer, giving the desired flexibility at the point of connection of the end of the band A to the connecting member D and avoiding the sewing of the end of the band A to the connecting member D, which is apt to cut the rubber threads of the band A. To the lower end of the connecting member D is attached the usual tab G that carries the usual loop and button $g$ and $g'$ for attachment to the upper portion of the hose, this tab G being united to the connecting member D by a row of stitching $d^2$. The connecting member D is formed with five sides or edge portions arranged angularly to each other, as shown. The two upper edges of the connecting member D are at substantially right angles to each other and of a length approximately equal to the width of the leg-encircling band A. By this construction, the connecting member may be made very simple and inexpensive and the fixed end of the band A and the tab C can be arranged to diverge at the proper angle for most comfortably fitting the leg of the wearer. The lower edge of the connecting member D is formed of a length approximately equal to the width of the tab G. It will be observed that the tab C extends to a considerable distance from the connecting member D so that the fastening plate or member B can be brought toward the side of the wearer's leg and thus avoid any pressure of the metal upon the bone.

By my present invention I provide an extremely simple, cheap and efficient construction of hose supporter, the connecting member of which is of such shape as to hold the fixed end of the leg-encircling band A and the tab C in proper diverging relation, with the use of the least possible material.

Having thus described my invention, what I claim as new and desire to secure by Letters Patent is—

1. The combination with a connecting member, of an elastic band and means for uniting one end of said band to the connecting member, comprising a metal clamp plate folded upon itself and having an inturned clamping edge to engage the fabric, the fabric strip covering said metal clamp plate and united to said connecting member, portions of said fabric strip and the end of said band being held between the jaws of said clamp plate.

2. In a hose supporter comprising an elastic leg encircling band and connecting member provided at its lower edge with a tab having a hose engaging fastening, and means for detachably uniting the front end of said leg encircling band to said connecting member, means for attaching the fixed end of said leg encircling band to said connecting member, comprising a metal clamp plate and a fabric strip, the end of said leg encircling band and portions of said fabric strip being within the jaws of said clamp plate, said fabric strip covering said clamp plate and being united to said connecting member.

CHARLES P. KUEHN.

Witnesses:
GEO. P. FISHER,
J. G. ANDERSON.

Copies of this patent may be obtained for five cents each, by addressing the "Commissioner of Patents, Washington, D. C."